(12) United States Patent
McBride et al.

(10) Patent No.: US 11,415,224 B2
(45) Date of Patent: Aug. 16, 2022

(54) SPLIT V-RING SEAL ASSEMBLY

(71) Applicant: AKTIEBOLAGET SKF, Gothenburg (SE)

(72) Inventors: Tadd McBride, Riverton, UT (US); Brandon Green, Taylorsville, UT (US); Greg G. Gildea, Park City, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 132 days.

(21) Appl. No.: 16/903,949

(22) Filed: Jun. 17, 2020

(65) Prior Publication Data
US 2021/0396314 A1    Dec. 23, 2021

(51) Int. Cl.
*F16J 15/06* (2006.01)

(52) U.S. Cl.
CPC .................. *F16J 15/067* (2013.01)

(58) Field of Classification Search
CPC .... F16J 15/00; F16J 15/02; F16J 15/46; F16J 15/48; F16J 15/06; F16J 15/067; F16J 15/025; F16J 15/3204; F16J 15/3232
USPC ....................................................... 277/631
See application file for complete search history.

(56) References Cited

U.S. PATENT DOCUMENTS

| | | | | |
|---|---|---|---|---|
| 4,234,198 A | * | 11/1980 | Martin | F16J 15/024 277/598 |
| 4,417,735 A | * | 11/1983 | Heisler | F16L 25/0018 277/608 |
| 8,851,481 B2 | * | 10/2014 | Epshetsky | F16J 15/328 277/572 |
| 9,132,539 B1 | * | 9/2015 | Epshetsky | F16J 15/3456 |
| 9,140,365 B1 | * | 9/2015 | Reimer | E02F 9/006 |
| 9,423,030 B2 | * | 8/2016 | Klousia | E02F 9/006 |
| 9,879,783 B1 | * | 1/2018 | Reimer | F16J 15/3232 |
| 10,520,094 B2 | * | 12/2019 | Rommann | F16J 15/3236 |
| 2013/0087976 A1 | * | 4/2013 | Epshetsky | F16J 15/328 277/311 |

* cited by examiner

*Primary Examiner* — Nathan Cumar
(74) *Attorney, Agent, or Firm* — J-Tek Law PLLC; Scott T. Wakeman; Mark A. Ussai (57) ABSTRACT

A seal assembly includes an annular seal body disposable about a first member and having an axial sealing lip engageable with the radial surface of a second member, first and second circumferential ends and an outer circumferential surface. A plurality of teeth extend outwardly from the outer surface and are spaced circumferentially about a centerline. A first coupler member has teeth disposed between and attached to the teeth of the seal body to form a first attachment interface adjacent to the seal body first end. A second coupler member has teeth disposed between and attached to the teeth of the seal body to form a second attachment interface adjacent to the seal body second end. The first and second coupler members are connected so as to couple the two ends of the seal body and to retain the seal assembly about the first member.

21 Claims, 9 Drawing Sheets

SPLIT V-RING SEAL ASSEMBLY

BACKGROUND OF THE INVENTION

The present invention relates to seals, and more particularly to seals for sealing against a radial surface.

Seals for sealing against a radial surface or "axial face" are known and typically include an annular body disposed about a first member and having a lip for sealing against an axial face/radial surface of a second member disposed about or adjacent to the first member. One such type of seal is commonly referred to as a "V-ring" seal which includes an annular main body and an axially-extending lip separated from the main body by an annular groove, such that the seal has generally V-shaped cross-sections. Such seals are usually fabricated in numerous different standard sizes that are each made to fit about a specific size of a first member, such as a shaft.

SUMMARY OF THE INVENTION

In one aspect, the present invention is a seal assembly for sealing between a first member and a second member, the first member having an outer circumferential surface and the second member being disposed about or adjacent to an end of the first body and having a radial surface. The seal assembly comprises an annular seal body disposable about the first member and having a centerline, an axially-extending sealing lip engageable with the radial surface of the second member, two circumferential ends and an outer circumferential surface. A plurality of teeth extend outwardly from the outer circumferential surface and are spaced circumferentially about the centerline. A first coupler member has a plurality of spaced apart teeth, each tooth of the first coupler member being disposed between a separate pair of adjacent teeth of the seal body so as to define a first attachment interface adjacent to the first circumferential end of the seal body. The first coupler member is attached to the annular body at the first attachment interface. Further, a second coupler member has a plurality of spaced apart teeth, each tooth of the second coupler member being disposed between a separate pair of adjacent teeth of the seal body so as to define a second attachment interface adjacent to the second circumferential end of the seal body. The second coupler member is attached to the annular body at the second attachment interface. The first and second coupler members are connected so as to couple the first and second ends of the seal body and to retain the seal assembly about the first member outer circumferential surface.

In another aspect, the present invention is a method of forming a seal assembly for sealing between a first member and a second member disposed about or adjacent to an end of the first member. The method comprises the steps of: molding an integral annular seal body having a centerline, an inside diameter and an outer circumferential surface; providing first and second coupler members; calculating a reduction of a circumferential length of the integral seal body to reduce the inside diameter of the seal body to a desired value of about an outside diameter of the first member; removing an arcuate portion of the calculated length from the seal body so as to form first and second circumferential ends and reduce the body inside diameter to the desired value when the first and second circumferential ends are connected; attaching the first and second coupler members to the outer surface of the seal body; and connecting the first and second coupler members such that the body first and second circumferential ends are at least generally adjacent and the seal body is retained in an annular configuration with an inside diameter of the desired value.

In a further aspect, the present invention is again a method of forming a seal assembly, comprising the steps of: molding an annular seal body having an inside diameter, an outer circumferential surface and a plurality of teeth extending outwardly from outer surface; providing first and second coupler members each having opposing ends and a plurality of teeth spaced between the ends; calculating a reduction of a circumferential length of the molded body to reduce the inside diameter of the seal body to a desired value; juxtaposing the first coupler member against the seal body outer surface such that each one of the teeth of the first coupler member is disposed between a separate pair of adjacent teeth of the seal body so as to form a first attachment interface and attaching the juxtaposed first coupler member to the seal body; juxtaposing the second coupler member against the seal body outer surface such that each one of the teeth of the first coupler member is disposed between a separate pair of adjacent teeth of the seal body so as to form a second attachment interface and attaching the juxtaposed second coupler member to the seal body, the second attachment interface having an inner end spaced from an inner end of the first attachment interface by a distance about equal to the calculated reduction of circumferential length; cutting through the seal body adjacent to the inner end of the first interface to form a first circumferential end of the seal body and cutting through the seal body adjacent to the inner end of the second attachment interface so as to remove a section of the seal body of having a length about equal to the calculated reduction of circumferential length; and connecting the first and second coupler members such that the seal body first and second circumferential ends are at least generally adjacent and the seal body is retained in an annular configuration with an inside diameter of the desired value.

In yet another aspect, the present invention is again a seal assembly for sealing between a first member and a second member, the first member having an outer circumferential surface and the second member being disposed about or adjacent to an end of the first body and having a radial surface. The seal assembly comprises an annular seal body disposable about the first member and having a centerline, an axially-extending sealing lip engageable with the radial surface of the second member, two circumferential ends, and an outer circumferential surface. At least one of a plurality of projections extend outwardly from the outer circumferential surface and spaced circumferentially about the centerline and a plurality of openings are spaced circumferentially about the centerline. A first coupler member has at least one of a plurality of spaced apart projections each disposed within a separate one of the openings of the seal body and a plurality of spaced apart openings each receiving a separate projection of the seal body so as to define a first attachment interface adjacent to the first circumferential end of the seal body, the first coupler member being attached to the seal body at the first attachment interface. Further, a second coupler member has at least one of a plurality of spaced apart projections each disposed within a separate one of the openings of the seal body and a plurality of spaced apart openings each receiving a separate projection of the seal body so as to define a second attachment interface adjacent to the second circumferential end of the seal body, the second coupler member being attached to the seal body at the second attachment interface. The first and second coupler members are connected so as to couple the first and second circumferential ends of the seal body and retain the seal assembly about the first member outer circumferential surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 10A-10D, collectively FIG. 10, are each a perspective view of a separate step in one method of forming the seal assembly.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a seal assembly 10 for sealing between a first member 1 having a central axis $A_C$ and an outer circumferential surface 1a and a second member 2 disposed about, or adjacent to an end of, the first member 1 and having a radial surface 2a, one of the members 1, 2 being rotatable or pivotable about the axis $A_C$. For example, the first member 1 may be a bearing inner ring and the second member 2 may be an outer housing, the first member 1 may be a shaft and the second member 2 may be a seal case, etc. The seal assembly 10 basically comprises an annular seal body 12 with two circumferential ends 12a, 12b and first and second coupler members 14, 16, respectively, attached to the seal body 12 and connectable to couple the body ends 12a, 12b. Preferably, the seal body 12 and the first and second coupler members 14, 16 are each formed of an elastomeric material, most preferably natural or synthetic rubber, but may be formed of any other appropriate material(s). The seal body 12 is disposable about, and coupleable with, the first member 1 and has a centerline $L_C$ and an axially-extending sealing lip 18 sealingly engageable with the radial surface 2a of the second member 2. The seal body 12 further has an inner circumferential surface 13A sealingly engageable with the first member 1, an opposing outer circumferential surface 13B and a plurality of projections 19 and/or openings 21 spaced circumferentially about the centerline $L_C$. Preferably, the body 12 has both a plurality of axial teeth 20 extending outwardly from the outer circumferential surface 13B and providing the projections 19, and a plurality of axial channels 26 each defined between a separate pair of adjacent teeth 20 and providing the openings 21.

Further, the first and second coupler members 14, 16 each have at least one of complementary projections 19 or/and complementary openings 21 designed to engage with the specific structure of the seal body 12. That is, the two coupler members 14, 16 each include at least projections 19 disposable within openings 21 of the seal body 12 or openings 21 for receiving projections 19 of the seal body 12. Preferably, the first coupler member 14 has a plurality of spaced apart teeth 22 providing projections 19 and a plurality of channels 35 defined between the teeth 22 and providing openings 21. Each tooth 22 of the first coupler member 14 is disposed in a channel 26 between a separate pair of adjacent teeth 20 of the seal body 12 so as to define a first attachment interface $AI_1$ adjacent to the first circumferential end 12a of the seal body 12. The first coupler member 14 is attached to the annular body 12 at the first attachment interface $AI_1$, preferably by bonding through means of an appropriate adhesive, etc., but may be attached by fasteners or any other appropriate means.

Additionally, the second coupler member 16 also has a plurality of spaced apart teeth 24 providing projections 19 and a plurality of channels 37 defined between the teeth 24 and providing openings 21. Each tooth 24 of the second coupler member 16 is disposed between a separate pair of adjacent teeth 20 of the seal body 12 so as to define a second attachment interface $AI_2$ adjacent to the second circumferential end 12b of the seal body 12. The second coupler member 16 is attached to the annular body 12 at the second attachment interface $AI_2$, preferably by adhesive bonding or another appropriate means (fasteners, thermal bonding, etc.).

Furthermore, the first and second coupler members 14, 16 are connected together so as to couple the first and second ends 12a, 12b of the seal body 12 and to retain the seal assembly 10 about the outer circumferential surface 1a of the first member 1. Preferably, the first and second circumferential ends 12a, 12b of the seal body 12 are abutting when the coupler members 14, 16 are connected. However, the seal body ends 12a, 12b may alternatively be spaced apart by an intermediary member (e.g., an elastomeric spacer, none shown) particularly if the seal body inside diameter $ID_1$ is unintentionally formed substantially less than the outside diameter $OD_1$ of the first member 1, as discussed below. However, it is generally desirable to form the seal body inside diameter Di less than the first member outside diameter $OD_1$ by a certain amount in order to provide diametrical interference between the seal body 12 and the first member 1 so as to frictionally couple the seal assembly 10 with the member 1.

Figure 10A:
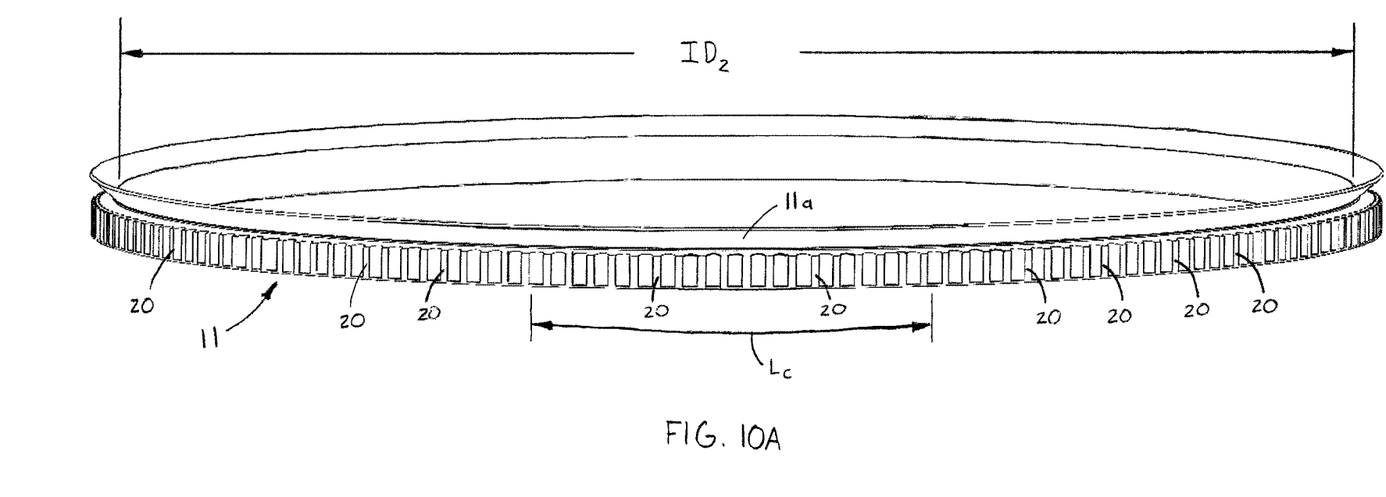

As discussed in greater detail below, the seal body 12 is preferably formed by "cutting down" an integral seal body 11 to a desired size for a particular application, i.e., to fit the outside diameter $OD_1$ of the first member 1. That is, the seal body 12 has a first inside diameter $ID_1$ of a desired value and is formed by cutting an arcuate portion 11*a* from an integral annular body 11 having a second, greater inside diameter $ID_2$, as shown in FIG. 10A. Further, each one of the first and second coupler members 14, 16 is preferably formed from a separate generally rectangular block 30, 32, respectively, having an elongated surface 31A, 33A, with the teeth 22, 24 of each one of the first and second coupler members 14, 16 extending from the block elongated surface 31A, 33A. Furthermore, each block 30, 32 is bended such that the elongated surface 31A, 33A is juxtaposable against the curved seal body outer circumferential surface 13B to form the attachment interfaces $AI_1$, $AI_2$ as described above and in further detail below. Preferably, the coupler members 14, 16 are attached to the molded seal body 11 and then the arcuate portion 11*a* is removed (e.g., by cutting), but may be attached to the seal body 12 after removing the arcuate portion 11*a*. Having described the basic components and structure above, these and other elements of the seal assembly 10 are described in detail below.

Referring now to FIGS. 1 and 5-7, the seal body 12 preferably includes a main body section 40 having generally rectangular axial cross-sections and providing the seal body inner and outer circumferential surfaces 13A, 13B. The seal main body section 40 has two opposing axial ends 40*a*, 40*b*, the sealing lip 18 extending axially and radially outwardly from the one axial end 40*a* and each of the plurality of teeth 20 extending axially between the two axial ends 40*a*, 40*b*. Further, the sealing lip 18 is generally frustoconical and has an inner radial end 18*a* integrally formed with the main body section 40 and a free, outer radial end 18*b* engageable with the radial surface 2*a* of the second member 2, an annular groove 42 being defined between the sealing lip 18 and the main body section 40.

Figure 6:
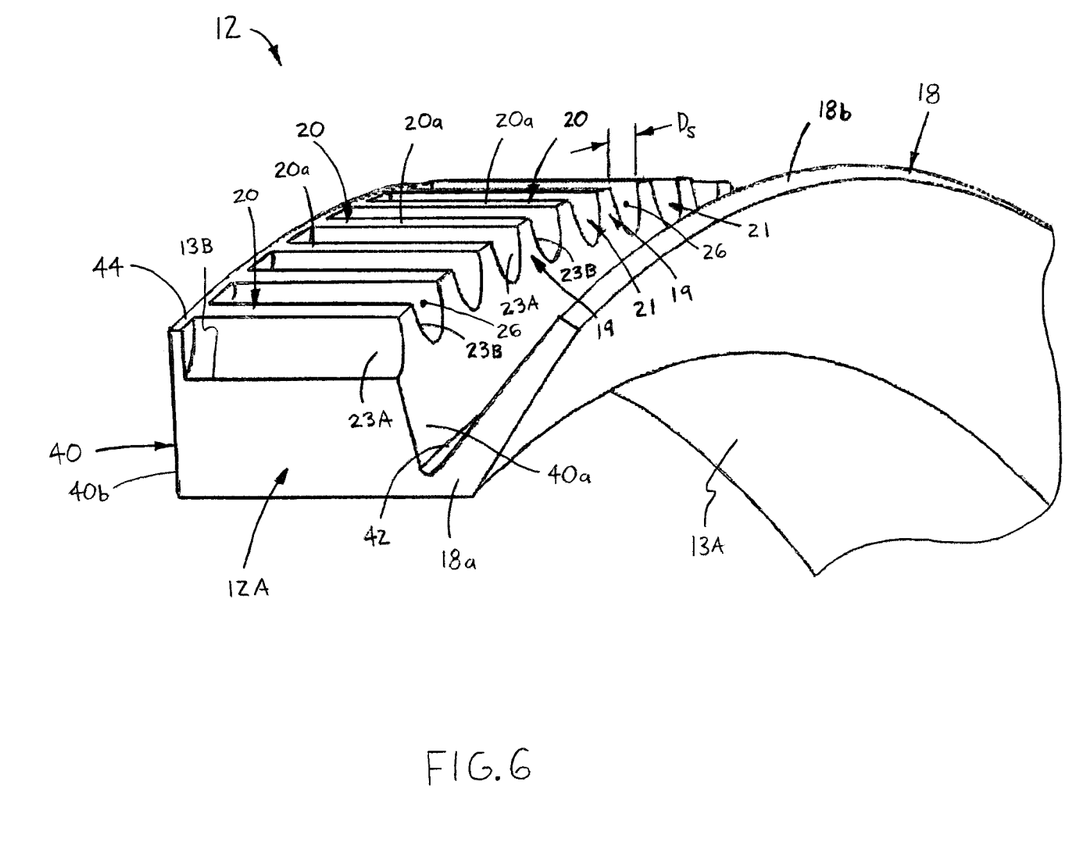
FIG. 6 is a broken-away, perspective view of a seal body.
Figure 7:
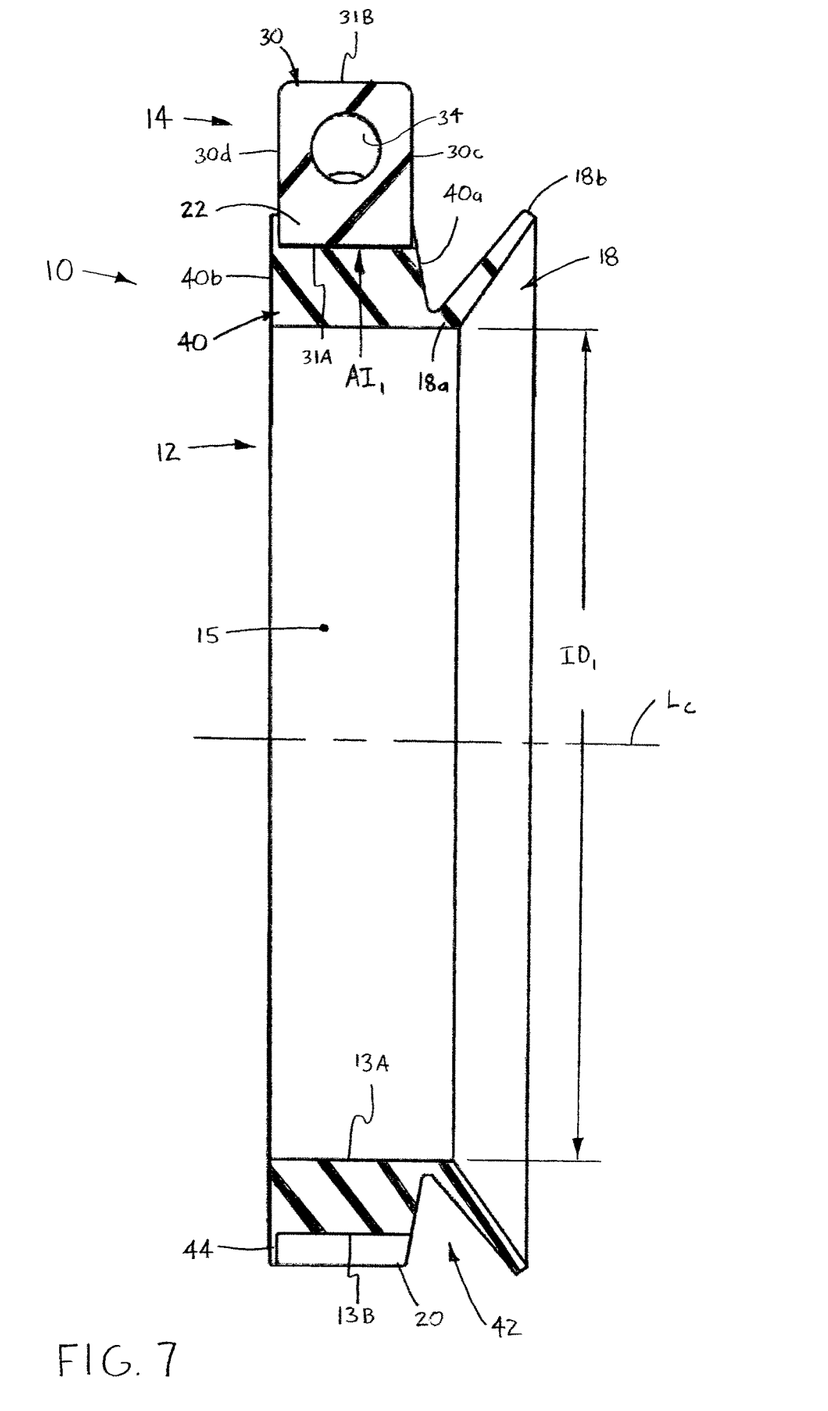
FIG. 7 is an axial cross-sectional view of the seal assembly.

As best shown in FIG. 6, each one of the teeth 20 of the seal body 12 preferably has a flat outer end surface 20*a* and a pair of curved concave side surfaces 23A, 23B, such that a generally semicircular axial channel 26 is defined between each pair of adjacent teeth 20, for reasons discussed above and in further detail below. Further, each one of the plurality of teeth 20 of the seal body 12 are preferably spaced from each adjacent tooth 20 by a spacing distance $D_S$, which corresponds to the width of each coupler member tooth 22 or 24, as discussed below. Furthermore, the main body section 40 of the seal body 12 preferably includes a radial flange 44 extending outwardly from the outer circumferential surface 13B adjacent to the body second axial end 40*b*. As such, the flange 44 encloses one end of each channel 26, which assists in retaining each coupler 14, 16 during bonding at each one of the first and second attachment interfaces $AI_1$, $AI_2$.

Figure 5:
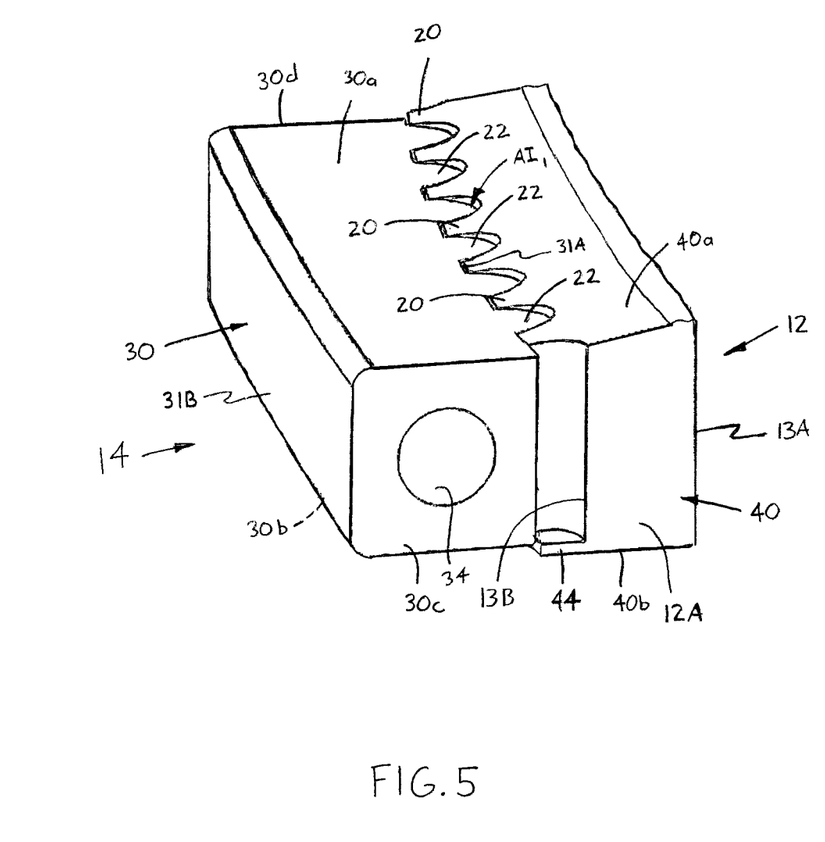
FIG. 5 is an enlarged, broken-away perspective view of the seal assembly, showing an attached first coupler member.
Figure 8:
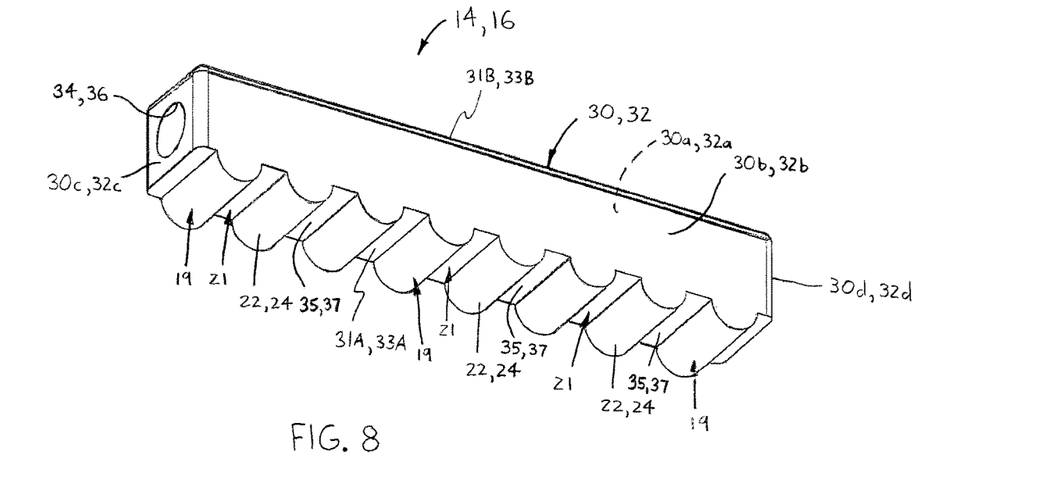
FIG. 8 is a perspective view of a coupler member block.
Figure 9:
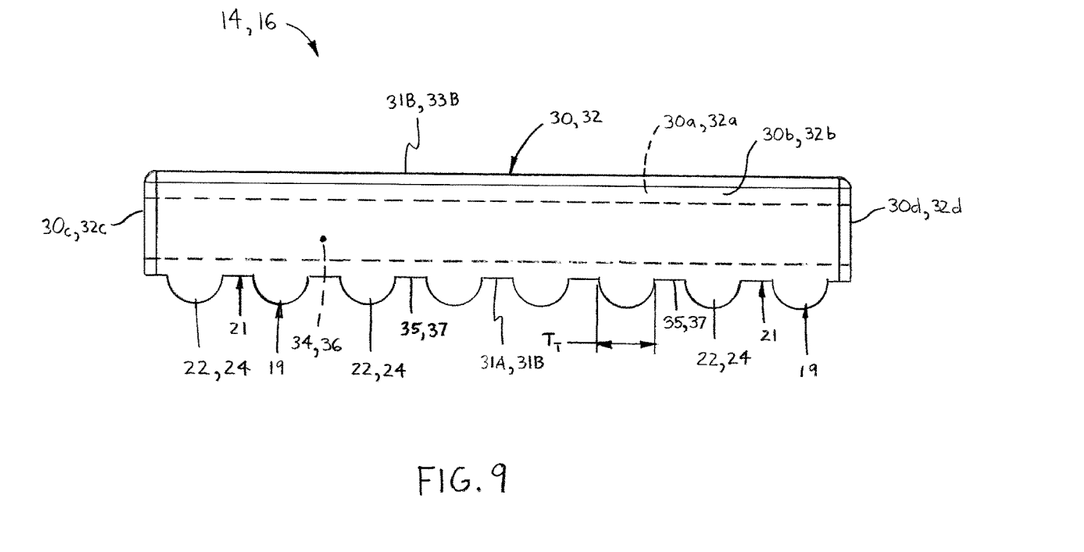
FIG. 9 is side plan view of the coupler member block.

Referring now to FIGS. 5, 8 and 9, each elongated block 30, 32 of the first and second coupler members 14, 16, respectively, is preferably bended or arcuate (although relatively shallowly) when attached to the seal body 12 and positioned such that the elongated surfaces 31A, 31B are inner circumferential surfaces, as best shown in FIG. 5. Further, each block 30, 32 further has an opposing outer circumferential surface 31B, 33B, a first axial end 30*a*, 32*a*, an opposing second axial end 30*b*, 32*b*, an inner circumferential end 30*c*, 32*c* and an opposing outer circumferential end 30*d*, 32*d*. The terms "inner" circumferential ends 30*c*, 32*c* are intended to indicate that these ends 30*c*, 32*c* are abutting (or at least adjacent to each other) when the coupler members 14, 16 are connected, while the "outer" ends 30*d*, 32*d* are on the external ends of the connected coupler members 14, 16.

Further, the teeth 22, 24 of each one of the first and second coupler members 14, 16 project from the inner circumferential surface 31A, 33A of each coupler member block 30, 32 so as to extend between the block first and second axial ends 30*a*, 30*b* and 32*a*, 32*b*, respectively. The teeth 22, 24 are spaced apart between the block inner and outer circumferential ends 30*c*, 30*d* and 32*c*, 32*d*, respectively, such that axial channels 35, 37 are defined between each pair of adjacent teeth 20, 24, respectively. Preferably, each tooth 22, 24 of each one of the first and second coupler members 14, 16 has a thickness TT (FIG. 9) about equal to or lesser than the spacing distance $D_S$ (FIG. 6) of the teeth 20 of the seal body 12. Further, each one of the coupler member teeth 22, 24 has a generally semicircular cross-sectional shape and is disposed within a separate one of the axial channels 26 of the seal body 12 and against the curved side surfaces 23A and 23B of a pair of adjacent teeth 20 of the seal body 12, as best shown in FIG. 5. With such a structure of the interlocking teeth 20/22 or 20/24, each bonded attachment interface $AI_1$, $AI_2$ are able to withstand substantially greater circumferential stresses (e.g., hoop shear) in comparison with a "flat" attachment interface. The greater strength of the bonded interfaces $AI_1$, $AI_2$, particularly in comparison with an interface of two "flat" surfaces, is due both to the substantially greater bonded surface area for a given circumferential length of each interface $AI_1$, $AI_2$ and the capability of the interlocking teeth 20/22 and 20/24 to resist circumferential forces as opposed to an adhesive layer alone.

Figure 1:
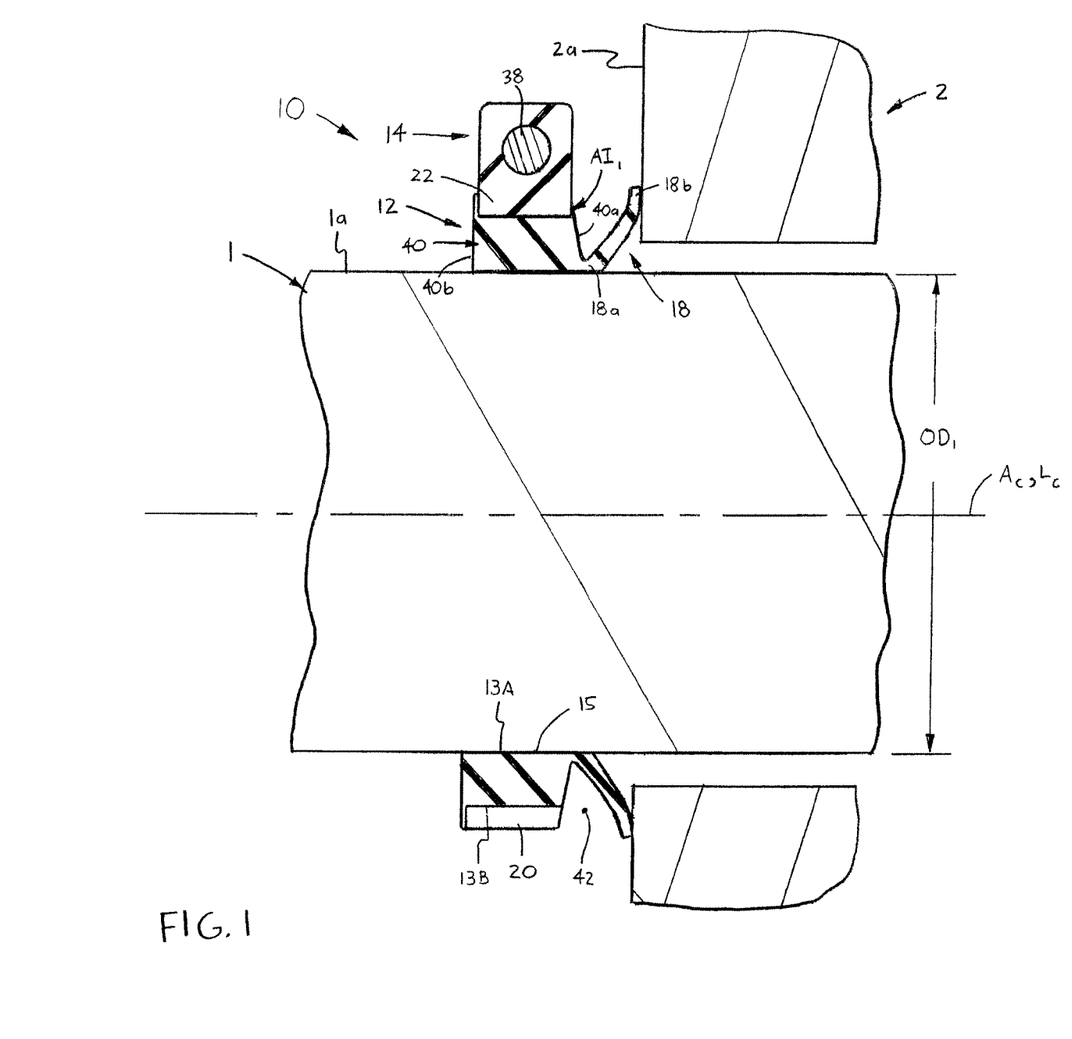
FIG. 1 is an axial cross-sectional view of a seal assembly of the present invention, shown disposed about a first member and sealing against a second member.
Figure 2:
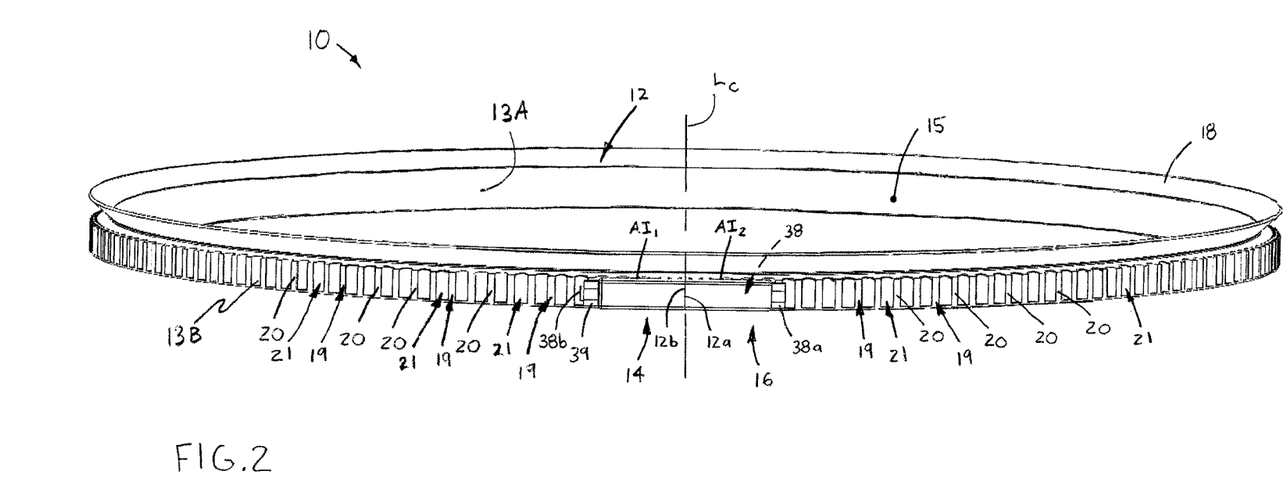
FIG. 2 is a perspective view of the seal assembly.
Figure 3:
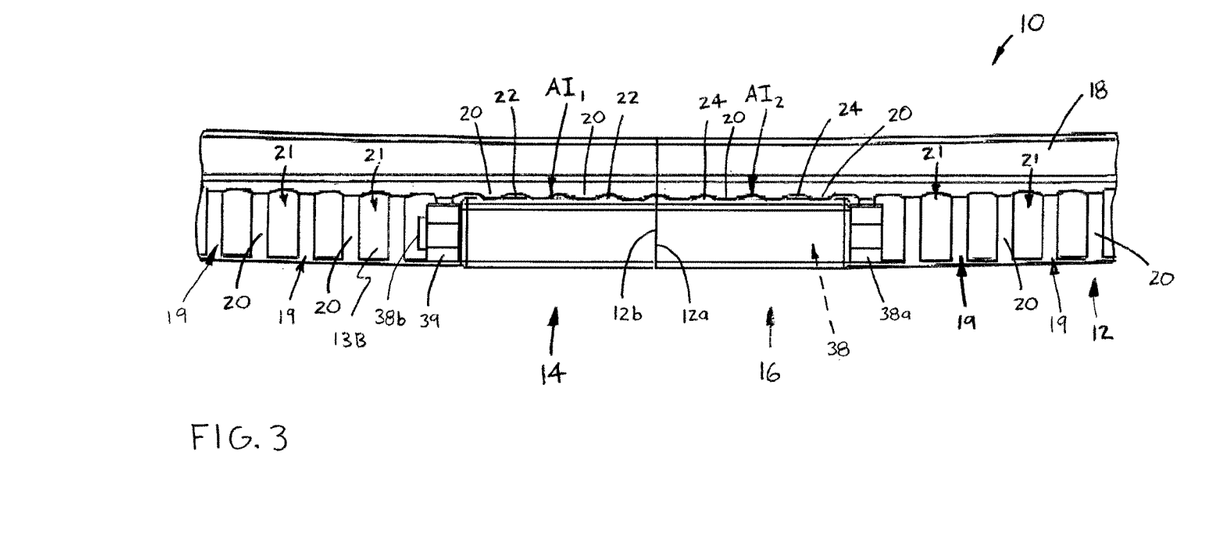
FIG. 3 is an enlarged, broken-away view of a central portion of FIG. 2.
Figure 4:
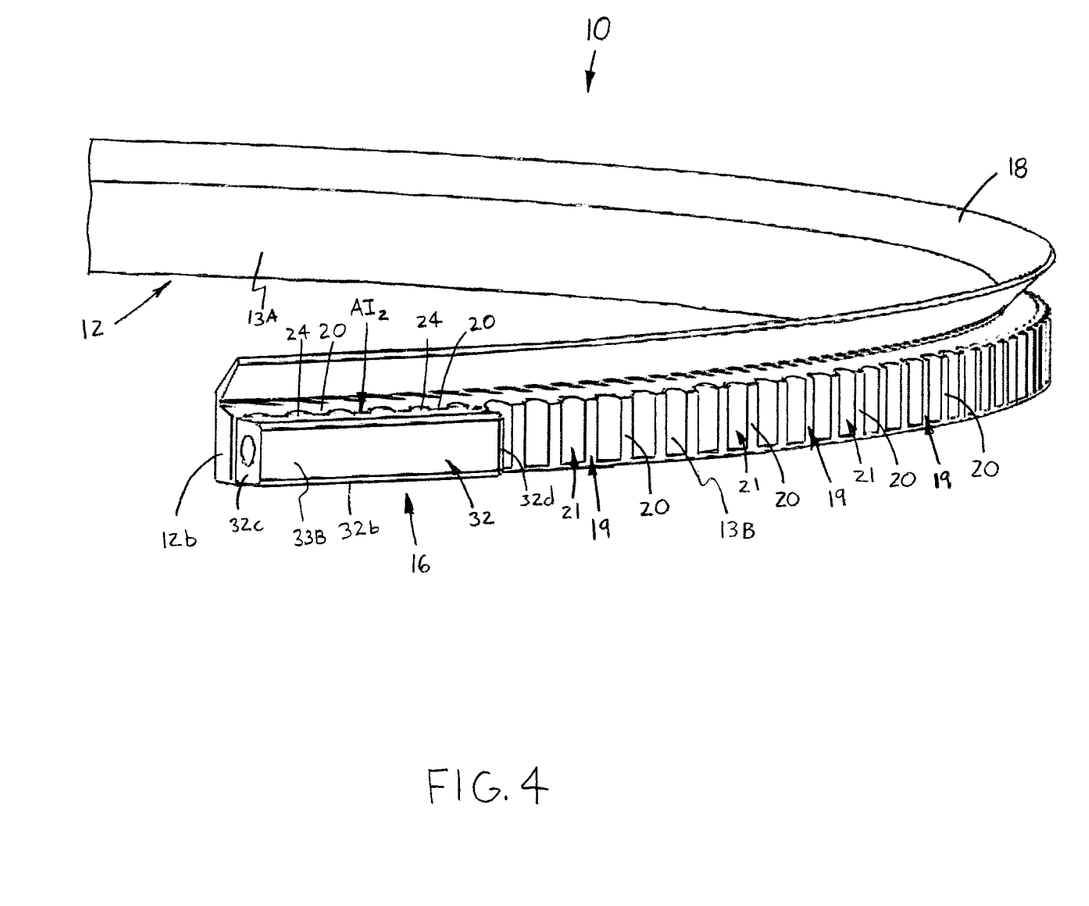
FIG. 4 is a broken-away perspective view of the seal assembly, showing an attached second coupler member.
Figure 10B:
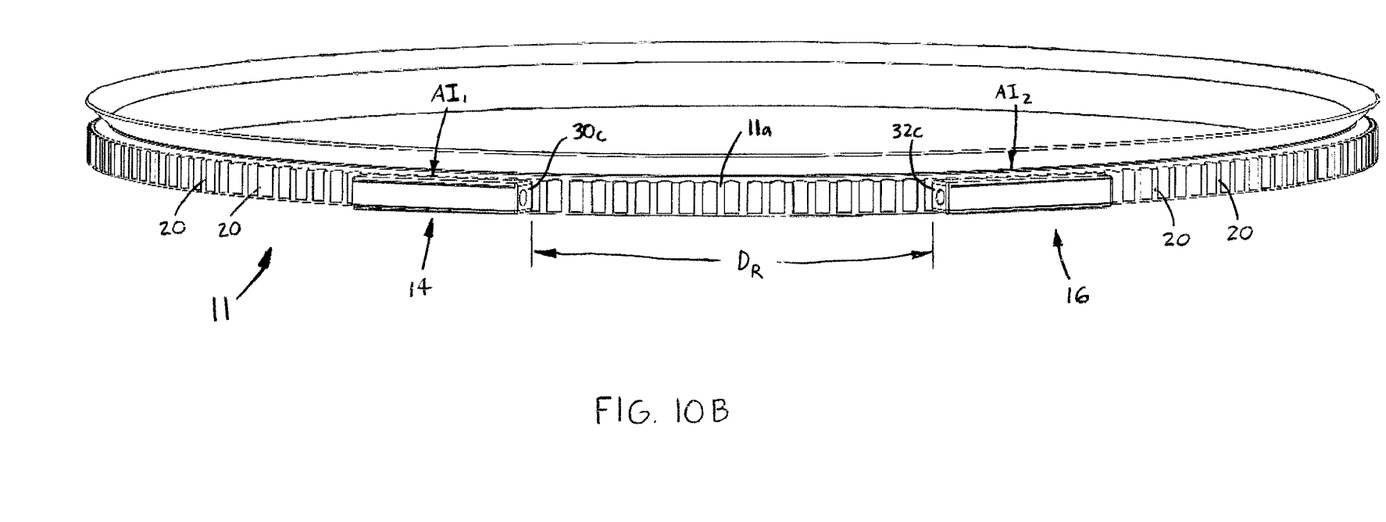
Figure 10C:
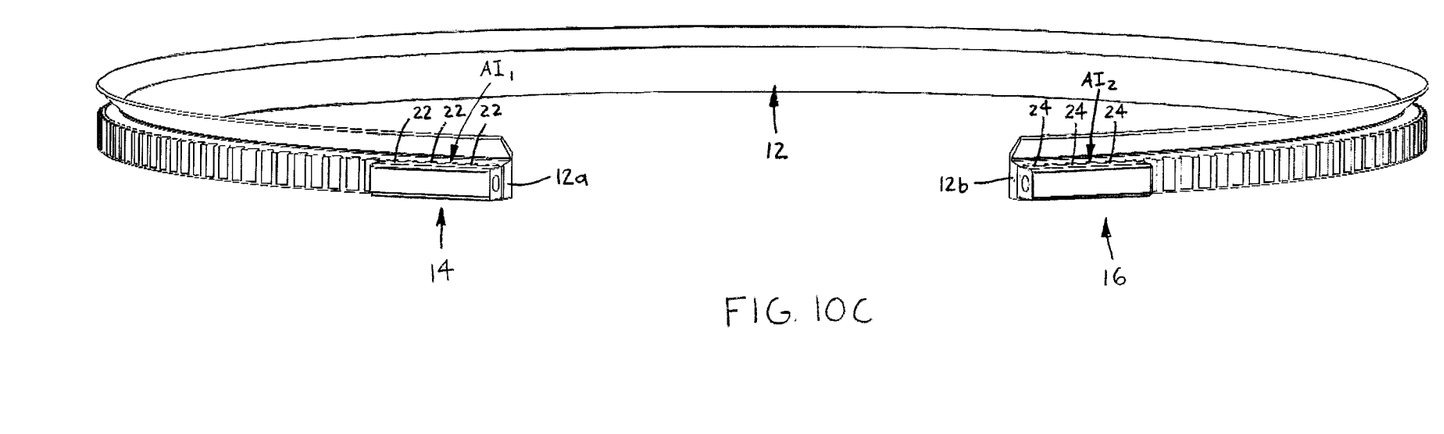
Figure 10D:
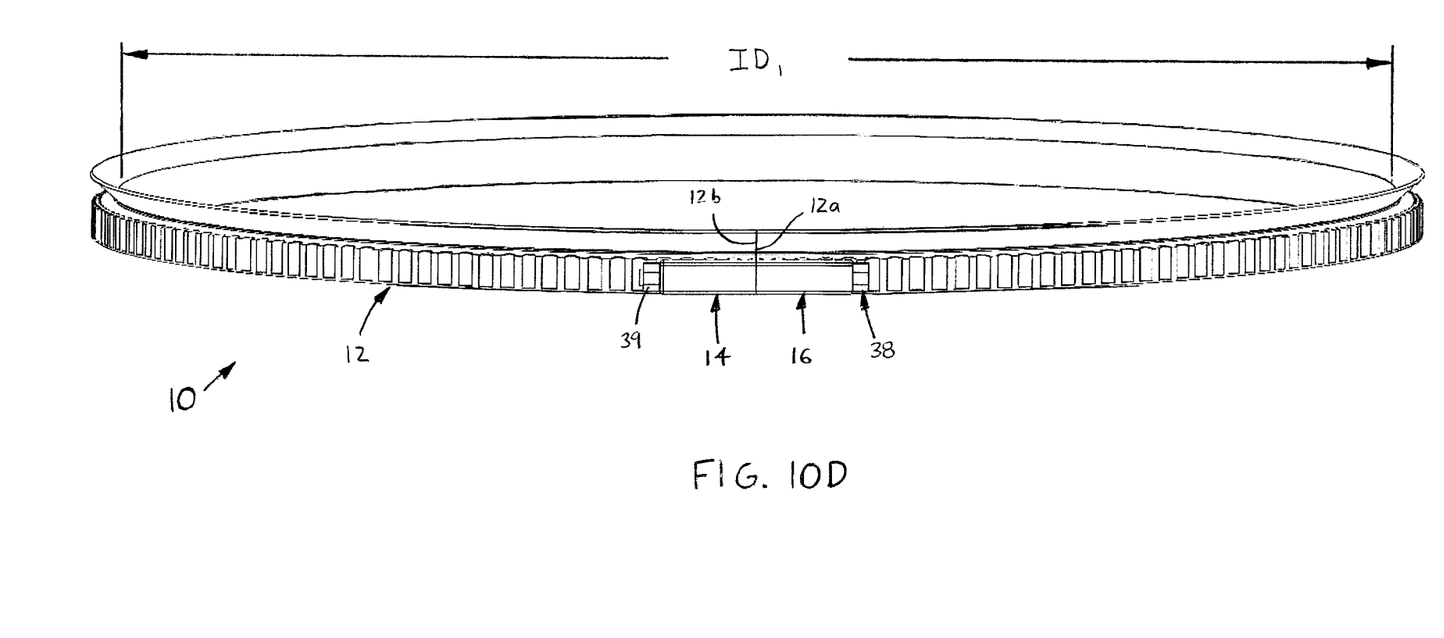

Preferably, the elongated block 30, 32 of each one of the first and second coupler members 14, 16 further includes a bore 34, 36, respectively, extending between the two circumferential ends 30*c*, 30*d* and 32*c*, 32*d* of the respective block 30, 32. As such, the seal assembly 10 preferably further comprises a fastener 38 extending through the bore 34, 36 of each one of the coupler member blocks 30, 32 and configured to connect the first and second coupler members 14, 16, as shown in FIGS. 2, 3 and 10D. Specifically, the fastener 38 is preferably a conventional bolt having a head 38*a* abutting against the outer circumferential end 30*d* or 32*d* of one block 30, 32 and a threaded portion 38*b* extending outwardly from the other circumferential end 32*d*, 30*d*. A nut 39 is threadably engaged with the bolt threaded portion 39*a* such that the coupler members 14, 16, and thus the seal body ends 12*a*, 12*b*, are releasably coupled. Due to the relatively shallow curvature of the attached coupler blocks 30, 32 and the elasticity of the preferred elastomeric materials of the coupler members 14, 16, the fastener 38 is capable of insertion through the aligned bores 34, 36 even though the bores 34, 36 have a degree of curvature.

With the preferred fastener 38 described above, the fastener 38 is removable from the first and second coupler members 14, 16 in order to disassemble the seal assembly 10 from about the first member 1. Thus, the seal assembly 10 is both installable about the first member 1 when the member 1 is assembled into a machine or other final application, which may prevent installation of an integral seal body, and readily removable from the member 1 in the assembled state. However, the coupler members 14, 16 may be connected together, removably or permanently, by any other appropriate means, such as for example, another type of fastener, an interlocking projection and recess of the blocks 30, 32, a rivet through the blocks 30, 32, etc.

Referring to FIGS. 10A-10D, the present seal assembly 10 is preferably formed in the following manner. First, an integral annular seal body 11 is molded having an inside diameter of the second, greater value $ID_2$ and the plurality of teeth 20 spaced about the entire circumference of the body 11, as shown in FIG. 10A. By forming teeth 20 about the entire circumference, the coupler members 14, 16 may be attached at any desired relative location about the circumference of the body 11. However, the teeth 20 may be provided around only a portion of the body perimeter or in two or more discrete sections of the perimeter (no alternatives shown). The coupler members 14, 16 are also formed or provided as the straight rectangular blocks 30, 32 with the coupler member teeth 22, 24, respectively, as best shown in FIGS. 8 and 9 and described above. Next, a reduction of the circumferential length or perimeter of the integral seal body 11 is calculated which will reduce the inside diameter of the seal body 12 to a desired value of about an outside diameter $OD_1$ (FIG. 1) of the first member 1.

After such calculation, an arcuate portion 11a of the calculated length $L_C$ is removed from the seal body 12 so as to form the seal body first and second circumferential ends 12a, 12b and reduce the body inside diameter to the desired value Di when the body first and second ends 12a, 12b are thereafter connected. Preferably, the first and second coupler members 14, 16 are attached to the integral seal body 11 prior to removal of the arcuate portion 11a, as best shown in FIG. 10B, most preferably by attaching the first coupler member 14 to the integral seal body 11 and then attaching the second coupler member 16 to the seal body 11 at a point spaced from the first coupler member 14. Specifically, the second coupler member 16 is located such that the inner circumferential end 32c of the second coupler member 16 is spaced from the inner circumferential end 30c of the first coupler member 14 by a distance DR of about the calculated reduction in circumferential length $L_C$ of the body 11, as indicated in FIG. 10B. When attaching the coupler members 14, 16, each coupler member 14, 16 is juxtaposed with the outer surface 13B of the seal body 12 such that each tooth 22 or 24 of each one of the first and second coupler members 14, 16 is disposed between a separate pair of adjacent teeth 20 of the seal body 12, as described above.

Thereby, the attachment of the coupler members 14, 16 defines the portion 11a from the remainder of the body 11, which is then removed from the body 11 by cutting the seal body 11 adjacent to the inner circumferential end 30c of the first coupler member 14 and also cutting the seal body 11 adjacent to the inner circumferential end 32c of the second coupler member 16. However, the desired body portion 11a may be removed by cutting through one or both coupler members 14, 16 (i.e., between block ends 30c/30d or/and block ends 32c/32d) and through the seal body 12, particularly if it is desired to "shorten" the circumferential length of the coupler member(s) 14, 16 (e.g., to reduce mass) or if the spacing distance between the attached coupler members 14, 16 is less than desired. Alternatively, the body arcuate portion 11a may first be removed by selecting any two points or locations on the body 11 spaced apart by the distance DR and then cutting through the body 11 at these two points/locations, thereby forming the seal body 12 with a desired overall length between the ends 12a, 12b. Then, the first coupler member 14 is attached to the seal body 12 adjacent to the body first circumferential end 12a and the second coupler member 16 is attached to the seal body 12 adjacent to the body second circumferential end 12b.

In either case, the coupler members 14, 16 are preferably attached the seal body 12 by applying an adhesive at the attachment interfaces $AI_1$, $AI_2$ such that the coupler member teeth 22 or 24 bond to and between pairs of adjacent teeth 20 of the seal body teeth 20. As mentioned above, the coupler members 14, 16 may instead be positioned against the seal body 11/12 to form the interfaces $AI_1$, $AI_2$ and then secured to the body 11/12 by fasteners, thermal fusion, etc. As a further alternative, both the seal body 12 and the coupler members 14, 16 may be formed without teeth and the coupler members 14, 16 may be attached by positioning the inner surfaces 31A, 33A of the coupler members 14, 16 against the seal body outer surface 13B and attaching by any appropriate means (e.g., adhesive bonding, fasteners, etc.).

Once the seal body 12 is formed with the attached coupler members 14, 16, the final seal assembly 10 is then formed by connecting the coupler members 14, 16 such that the body first and second circumferential ends 12a, 12b are at least generally adjacent and the seal body 12 is retained in an annular configuration with an inside diameter Di of the desired value, i.e., of about the outside diameter $OD_1$ of the first member 1. As discussed above, the first and second coupler members 14, 16 are preferably connected by inserting the fastener 38 through each of the first and second coupler members 14, 16 and then threading the nut 39 onto the end 38b of the fastener 38. In most cases, the seal body 12 with attached coupler members 14, 16 is installed about the first member 1 prior to connecting the first and second coupler members 14, 16 with the fastener 38, which is particularly beneficial when the first member 1 is incorporated within a machine or other device.

However, the formed seal assembly 10 with connected coupler members 14, 16 may instead be installed about the first member 1 by inserting an end (not shown) of the member 1 through the bore 15 of the seal body 12 and displacing the seal assembly 10 along the central axis $A_C$ until positioned at a desired location on the member outer surface 1a. In either case, the inner surface 13A of the seal body 12 preferably engages the first member outer surface 1a with sufficient frictional force to couple the seal assembly 10 with the first member 1, particularly if the member 1 is pivotable or rotatable about the central axis $A_C$, such that the seal assembly 10 is also pivotable or rotatable about the axis $A_C$.

Although the seal assembly 10 is shown and described as an embodiment in which each one of the seal body 12 and the first and second coupler members 14, 16 has both projections 19 in the form of teeth 20, 22, 24 and openings 19 in the form of channels 26, 35 and 37, the seal assembly 10 may have any other appropriate combination of projections 19 and openings 21. For example, the seal body 12 may be formed with a plurality of discrete, circumferentially-spaced cylindrical projections, pyramidal projections, etc. (neither shown) that are received within appropriately shaped openings (none shown) extending into the coupler blocks 30, 32, or vice-versa. The present invention encompasses any combination of appropriate projections 19 and openings 21 that enable the first and second coupler members 14, 16 to be engaged with the seal body outer circumferential surface 13B to form the seal assembly 10 as described in detail above.

The present seal assembly 10 has a number of advantages over prior known seal assemblies. First, a number of seal assemblies 10 of differing inside diameters ID1 may be formed from a single molded seal member 11 simply by removing a calculated length of the body 11 to obtain the desired final size. Also, by having removably connected coupler members 14, 16, the seal assembly 10 may be readily installed onto a member 1 simply by "wrapping" the seal body 12 with unconnected coupler members 14, 16 about the first member 1 at a desired location on the surface 1a and then connecting the coupler members 14, 16 as described above. Further, the seal assembly 10 may be easily uninstalled from the first member 1 by disconnecting the coupler members 14, 16, such as by unthreading the nut 39 and removing the fastener 38, and then "unwrapping" the seal body 12 from the first member 1. Finally, by providing attachment interfaces $AI_1$, $AI_2$ formed of interlocking teeth 20/22 and 20/24, respectively, the coupler members 14, 16 are able to withstand greater circumferential forces, for example caused by thermal expansion of the inner member 1, without becoming disengaged from the seal body 12 due to fracturing of the adhesive bonding of the coupler members 14, 16 to the body 12.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies. Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

We claim:

1. A seal assembly for sealing between a first member and a second member, the first member having an outer circumferential surface and the second member being disposed about or adjacent to an end of the first member and having a radial surface, the seal assembly comprising:
   an annular seal body disposable about the first member and having a centerline, an axially-extending sealing lip engageable with the radial surface of the second member, two circumferential ends, an outer circumferential surface and a plurality of teeth extending outwardly from the outer circumferential surface and spaced circumferentially about the centerline;
   a first coupler member having a plurality of spaced apart teeth, each tooth of the first coupler member being disposed between a separate one of a plurality of pairs of adjacent teeth of the annular seal body so as to define a first attachment interface adjacent to the first circumferential end of the annular seal body, the first coupler member being attached to the annular seal body at the first attachment interface; and
   a second coupler member having a plurality of spaced apart teeth, each tooth of the second coupler member being disposed between a separate one of a plurality of pairs of adjacent teeth of the annular seal body so as to define a second attachment interface adjacent to the second circumferential end of the annular seal body, the second coupler member being attached to the annular seal body at the second attachment interface, the first and second coupler members being connected so as to couple the first and second circumferential ends of the annular seal body and retain the seal assembly about the first member outer circumferential surface.

2. The seal assembly as recited in claim 1 wherein:
   the annular seal body has a first inside diameter and is formed by cutting an arcuate portion from an integral annular seal body having a second, greater inside diameter; and
   each one of the first and second coupler members is formed from a separate generally rectangular block having an elongated surface, the teeth of each one of the first and second coupler members extending from the block elongated surface and each block being bended such that the elongated surface is juxtaposable against the annular seal body outer circumferential surface.

3. The seal assembly as recited in claim 1 wherein each one of the first and second coupler members includes an elongated block having inner and outer circumferential surfaces, first and second axial ends, and two opposing circumferential ends, the teeth of each one of the first and second coupler members projecting from the inner circumferential surface of each coupler member block so as to extend between the block first and second axial ends and being spaced apart between the block first and second circumferential ends.

4. The seal assembly as recited in claim 3 wherein:
   the elongated block of each one of the first and second coupler members further includes a bore extending between the two circumferential ends of the block; and
   the seal assembly further comprises a fastener extending through the bore of each one of the coupler member blocks and configured to connect the first and second coupler members.

5. The seal assembly as recited in claim 4 wherein the fastener is removable from the first and second coupler members to disassemble the seal assembly from about the first member.

6. The seal assembly as recited in claim 1 wherein the first and second circumferential ends of the annular seal body are abutting or spaced apart by an intermediary member when the first and second coupler members are connected.

7. The seal assembly as recited in claim 1 wherein the annular seal body further has an inner circumferential surface sealingly engageable with the shaft.

8. The seal assembly as recited in claim 1 wherein the annular seal body includes a main body section having generally rectangular axial cross-sections and providing the seal body outer circumferential surface, the main body section further having an inner circumferential sealing surface engageable with the outer circumferential surface of the first member and two opposing axial ends, the sealing lip extending outwardly from one axial end of the main body section and each of the plurality of teeth extending between the two axial ends of the main body section.

9. The seal assembly as recited in claim 8 wherein the sealing lip is generally frustoconical and has an inner radial end integrally formed with the main body section and a free, outer radial end engageable with the second member, an annular groove being defined between the sealing lip and the main body section.

10. The seal assembly as recited in claim 1 wherein:
    the annular seal body has opposing first and second axial ends spaced apart along the centerline, each one of the plurality of teeth extending axially between the first and second axial ends; and
    each one of the first and second coupler members includes an elongated block with opposing first and second axial ends, each one of the plurality of teeth of each coupler member extending axially between the first and second ends of each coupler member block.

11. The seal assembly as recited in claim 1 wherein:
each one of the teeth of the annular seal body has a flat outer end surface and a pair of curved concave side surfaces such that a generally semicircular axial channel is defined between each pair of adjacent teeth; and
each one of the teeth of the first and second coupler members has a generally semicircular cross-sectional shape and is disposed within a separate one of the axial channels of the annular seal body and against the curved side surfaces of a pair of adjacent teeth of the annular seal body.

12. The seal assembly as recited in claim 1 wherein each one of the first and second coupler members is generally arcuate.

13. The seal assembly as recited in claim 1 wherein each one of the plurality of teeth of the annular seal body are spaced from each adjacent teeth by a spacing distance and each tooth of each one of the first and second coupler members has a thickness about equal to or lesser than the spacing distance.

14. A method of forming a seal assembly for sealing between a first member and a second member disposed about or adjacent to an end of the first member, the method comprising the steps of:
molding an integral annular seal body having a centerline, an inside diameter and an outer circumferential surface;
providing first and second coupler members;
calculating a reduction of a circumferential length of the integral annular seal body to reduce the inside diameter of the seal body to a desired value of about an outside diameter of the first member;
removing an arcuate portion of the calculated length from the integral annular seal body so as to form first and second circumferential ends and reduce the seal body inside diameter to the desired value when the first and second circumferential ends are connected;
attaching the first and second coupler members to the outer surface of the seal body; and
connecting the first and second coupler members such that the seal body first and second circumferential ends are at least generally adjacent and the seal body is retained in an annular configuration with an inside diameter of the desired value.

15. The method as recited in claim 14 wherein:
the step of attaching the first and second coupler members includes attaching the first coupler member to the integral annular seal body and then attaching the second coupler member to the integral annular seal body such that an inner end of the second coupler member is spaced from an inner end of the first coupler member by a distance of about the calculated reduction in circumferential length; and
the step of removing the arcuate portion from the integral annular seal body includes cutting the integral annular seal body adjacent to the inner end of the first coupler member and cutting the integral annular seal body adjacent to the inner end of the second coupler member.

16. The method as recited in claim 14 wherein the seal body is installed about the first member prior to connecting the first and second coupler members.

17. The method as recited in claim 14 wherein:
the integral annular seal body has a plurality of teeth extending outwardly from the body outer surface and spaced circumferentially about the centerline;
each of the first and second coupler members has a plurality of teeth; and
the step of attaching each coupler member to the integral annular seal body includes juxtaposing each one of the first and second coupler members to the outer surface of the integral annular seal body such that each tooth of each one of the first and second coupler members is disposed between a separate pair of adjacent teeth of the integral annular seal body.

18. The method as recited in claim 17 wherein:
the step of attaching each one of the first and second coupler members to the integral annular seal body further includes bonding the teeth of each one of the first and second coupler members to the adjacent teeth of the integral annular seal body; and
the step of connecting the first and second coupler members includes inserting a fastener through each of the first and second coupler members.

19. The method as recited in claim 14 wherein the step of removing the arcuate portion from the integral annular seal body includes cutting the integral annular seal body at two locations spaced apart by the calculated reduction of the seal body circumferential length.

20. A method of forming a seal assembly comprising the steps of:
molding an annular seal body having an inside diameter, an outer circumferential surface and a plurality of teeth extending outwardly from the outer circumferential surface;
providing first and second coupler members each having opposing ends and a plurality of teeth spaced between the ends;
calculating a reduction of a circumferential length of the molded annular seal body to reduce the inside diameter of the annular seal body to a desired value;
juxtaposing the first coupler member against the annular seal body outer surface such that each one of the teeth of the first coupler member is disposed between a separate one of a plurality of pairs of adjacent teeth of the annular seal body so as to form a first attachment interface and attaching the juxtaposed first coupler member to the annular seal body;
juxtaposing the second coupler member against the annular seal body outer surface such that each one of the teeth of the first coupler member is disposed between a separate one of a plurality of pairs of adjacent teeth of the annular seal body so as to form a second attachment interface and attaching the juxtaposed second coupler member to the annular seal body, the second attachment interface having an inner end spaced from an inner end of the first attachment interface by a distance about equal to the calculated reduction of circumferential length;
cutting through the annular seal body adjacent to the inner end of the first interface to form a first circumferential end of the annular seal body and cutting through the annular seal body adjacent to the inner end of the second attachment interface so as to remove a section of the annular seal body of having a length about equal to the calculated reduction of circumferential length; and
connecting the first and second coupler members such that the annular seal body first and second circumferential ends are at least generally adjacent and the annular seal body is retained in an annular configuration with an inside diameter of the desired value.

21. A seal assembly for sealing between a first member and a second member, the first member having an outer circumferential surface and the second member being disposed about or adjacent to an end of the first body and having a radial surface, the seal assembly comprising:
- an annular seal body disposable about the first member and having a centerline, an axially-extending sealing lip engageable with the radial surface of the second member, two circumferential ends, an outer circumferential surface and at least one of a plurality of projections extending outwardly from the outer circumferential surface and spaced circumferentially about the centerline and a plurality of openings spaced circumferentially about the centerline;
- a first coupler member having at least one of a plurality of spaced apart projections each disposed within a separate one of the openings of the annular seal body and a plurality of spaced apart openings each receiving a separate projection of the annular seal body so as to define a first attachment interface adjacent to the first circumferential end of the annular seal body, the first coupler member being attached to the annular seal body at the first attachment interface; and
- a second coupler member having at least one of a plurality of spaced apart projections each disposed within a separate one of the openings of the annular seal body and a plurality of spaced apart openings each receiving a separate projection of the annular seal body so as to define a second attachment interface adjacent to the second circumferential end of the annular seal body, the second coupler member being attached to the annular seal body at the second attachment interface, the first and second coupler members being connected so as to couple the first and second circumferential ends of the annular seal body and retain the seal assembly about the first member outer circumferential surface.

* * * * *